United States Patent
Royer

[15] 3,679,196
[45] July 25, 1972

BEST AVAILABLE COPY

[54] ELASTOMERIC SPRING BUMPER

[72] Inventor: Clady J. Royer, P.O. Box 75181, Oklahoma City, Okla. 73107

[22] Filed: Dec. 15, 1969

[21] Appl. No.: 884,941

[52] U.S. Cl. ............................267/140, 105/139, 180/9.54, 180/64, 248/9, 267/153, 280/111
[51] Int. Cl. ......................B60k 7/00, F16f 3/10, F16f 15/00
[58] Field of Search............105/138, 139, 368 R; 180/64, 180/9.54; 248/7, 8, 9, 10; 267/30, 52, 57.1, 63, 141, 140, 142, 153; 280/111

[56] References Cited

UNITED STATES PATENTS

| | | | |
|---|---|---|---|
| 336,593 | 2/1886 | Rogers | 267/30 |
| 1,664,662 | 4/1928 | Geyer et al. | 248/9 |
| 2,035,937 | 3/1936 | Anderson | 267/30 X |
| 2,211,295 | 8/1940 | Searles et al. | 248/9 X |
| 3,203,361 | 8/1965 | Sharp | 105/368 R |
| 3,236,326 | 2/1966 | Reynolds | 248/9 X |

*Primary Examiner*—James B. Marbert
*Assistant Examiner*—Howard Beltran
*Attorney*—Dunlap, Laney, Hessin & Dougherty

[57] ABSTRACT

An equalizer bar support pad structure for use in conjunction with frame supporting equalizer bars of the type used on tracked vehicles. The equalizer bar support pad structure includes a pair of tubular members secured to the upper central portion of the equalizer bar and projecting horizontally from opposite sides of the bar into the space defined between the legs of a pair of U-shaped spring metal members disposed on opposite sides of the bar, and each forming a portion of a support pad secured to the main frame support saddle. The support saddle is an arcuate member having a top plate which bears against the upper flange of the equalizer bar, but is not attached thereto. Each of the support pads, in addition to the U-shaped spring steel member, includes a body of an elastomeric material, such as rubber, which has a plurality of spring steel reinforcing elements embedded therein, and which is bonded to one or more mounting plates used for mounting the support pad to mounting brackets formed on side plates of the main frame support saddle.

8 Claims, 8 Drawing Figures

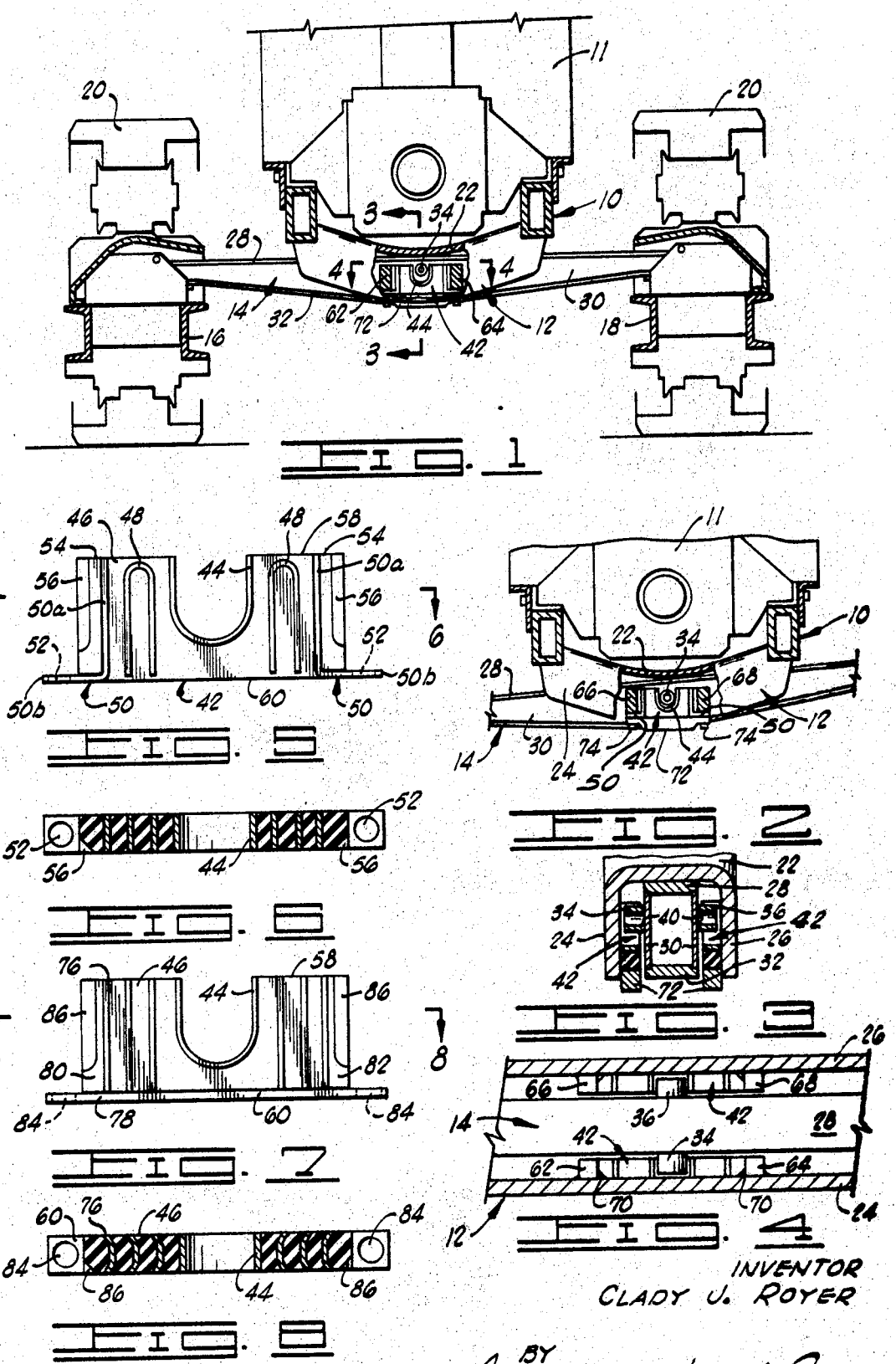

ELASTOMERIC SPRING BUMPER

BACKGROUND OF THE INVENTION

1. Field of the Invention

This invention relates to structures for supporting the engine and framework of a tracked vehicle on a pair of horizontally spaced trucks which carry endless crawler tracks. More particularly, the present invention relates to equalizer bar constructions and yet more specifically, to support pad structures used in conjunction with equalizer bars for supporting the main frame and engine of tracked vehicles on the horizontally spaced trucks thereof.

2. Brief Description of the Prior Art

It is a common practice in the construction of tracked vehicles, such as those made by the Caterpillar Tractor Company of Peoria, Illinois, to support the main frame and engine of the tracked vehicle on the horizontally spaced trucks or track roller frames which carry the tracks by means of an equalizer bar extended between the trucks, and supporting the frame and engine at the central portion thereof. There are several constructions utilized for transmitting the weight of the frame and engine to the equalizer bar, and in some of these, a main frame support member is fastened to the equalizer bar by a pivot pin. In other types of construction, the main frame support plate is an arcuate, saddle-shaped member which is not fastened to the equalizer bar, but simply rests on the upper side of the equalizer bar. This arrangement permits the equalizer bar and the frame support saddle to move relative to each other as the trucks or track roller frames oscillate. The type of movement which is experienced is a rocking motion of the saddle on the equalizer bar.

Where the described construction in which the frame support saddle is not fastened to the equalizer bar is employed, it is necessary to provide structure which effectively maintains the equalizer bar centered under the main frame support saddle. This centering action has been previously accomplished by welding a pair of chevron (V-shaped) plates on opposite sides of the equalizer bar at the center thereof, and then permitting these chevron plates to ride in, or register with, similarly shaped V-shaped plates which are bonded to the upper side of rubber pads. The rubber pads have their lower sides bonded to plates which are bolted to the main frame support saddle. The support pad, as thus constituted by the mass of rubber and the V-shaped plate bonded to the upper side thereof, in combination with the chevron plates welded to and projecting from opposite sides of the equalizer bar, constitute indexing means by which the equalizer bar is kept centered under the main frame support saddle.

In the described construction, the support pads bear no weight when the tractor is level since all of the weight is then transmitted through the main frame support saddle to the top side of the equalizer bar. When the equalizer bar rocks in the main frame support saddle, however, or when the front end of the tractor is raised (as a result of downward pressure exerted by the hydraulically operated bulldozer blade, for example), the support pads are then compressed as a result of the necessary movement of the plate forming a part thereof (which is bolted to the main frame support saddle) relative to the V-shaped plate at the upper side of the mass of rubber which is restricted from moving at this time by contact with the chevron plate secured to the equalizer bar. More specifically, the rubber portion of the support pad is compressed on the side of the pads which is nearest the track of the vehicle which is highest at that time, and the pads then receive a portion of the weight of the main frame and engine. This unequal distribution of weight to the support pads then results in the transfer of a greater portion of the weight to the truck or roller frame which is higher at that time.

Continued flexing of the equalizer bar support pads under the described condition leads ultimately to their deterioration so that they no longer provide a satisfactory centering action for the equalizer bar in relation to the main frame support saddle. Moreover, the support pads are no longer able to perform another function for which they are used, i.e., maintaining the equalizer bar in contact with the support saddle when the front of the machine is raised. When the equalizer bar is no longer adequately centered with respect to the support saddle, chafing and galling occur at the point of contact between the bar and the main support frame. The wear of the pads is then accelerated due to a certain amount of side loading which occurs. Moreover, the galling action will eventually develop clearance between the bar and the support saddle so that shock loading and resultant hammering of both the bar and the support saddle occur each time the front of the machine is raised and then dropped back on the equalizer bar. This sometime leads to cracking of the top portion of the support saddle, or the failure of certain weld joints in the bar, and the ultimate breaking of one or the other of these two primary structural members.

The result of this tendency of the described support pads to break down or undergo deterioration after varying periods of use is that they must be frequently inspected, and often must be replaced after a relatively short period of service in a difficult operating environment (such as side hill operations of the tracked vehicle).

BRIEF DESCRIPTION OF THE PRESENT INVENTION

The present invention comprises an improved equalizer bar support pad structure which is adapted for use in maintaining the centered relationship between an equalizer bar and a main frame support saddle which is not physically fastened to the equalizer bar by means of a pivot pin. In one aspect, the invention relates to the improved support pad structure per se, and in another aspect of the invention, the invention extends to the combination of this support pad structure with an equalizer bar and with the other portions of the tractor mechanism in which the support pad and equalizer bar are utilized.

Broadly described, the support pad structure of the invention comprises a U-shaped spring metal member positioned in a U-shaped recess formed in one side of a body of elastomeric material to which the spring metal member is bonded. Also bonded to the body of elastomeric material is retainer plate means facilitating securement of the support pad structure to the main frame supporting saddle of a tracked vehicle. In another aspect, the invention comprises the described support pad structure in combination with an elongated equalizer bar having projecting members extending from the central portion thereof normal to the longitudinal axis of the bar. Each projecting member projects into the space between the legs of a V-shaped spring metal member, there being a pair of the latter members forming parts of two support pad structures disposed on opposite sides of the equalizer bar. Finally, the invention is considered to reside in the combination of the support pad structures and equalizer bar with the main frame supporting saddle to which the support pad structures are secured by means of the retainer plate means.

An important object of the invention is to provide a support pad structure which can be used for centering the equalizer bar of a tracked vehicle in relation to a main frame supporting saddle forming a part of the tracked vehicle, the support pad structure being characterized in having a relatively long and defect-free service life.

Another object of the invention is to provide a support pad structure used between an equalizer bar and supporting saddle in crawler-type tracked vehicles, and capable of undergoing resilient deformation and stress loading without fracturing or sustaining permanent distortion.

A further object of the invention is to provide improved structure for supporting a tracked vehicle which includes a supporting saddle, an equalizer bar extending through and rockably supporting the saddle, and support pad structures keying the equalizer bar to the supporting saddle to maintain the relative positions thereof.

Additional objects and advantages of the invention will become apparent from the following detailed description of

BRIEF DESCRIPTION OF THE DRAWINGS

FIG. 1 is a somewhat schematic, partially elevational, partially sectional view of a crawler-type tracked vehicle which includes an equalizer bar, a supporting saddle and support pad structures.

FIG. 2 is a detail view of a portion of the structure shown in FIG. 1 and showing the relative positions of the equalizer bar, supporting saddle and support pad structures when the trucks or track roller frames of the tracked vehicle undergo oscillation.

FIG. 3 is a sectional view taken along line 3—3 of FIG. 1.

FIG. 4 is a sectional view taken along line 4—4 of FIG. 1.

FIG. 5 is a view in elevation of one embodiment of the support pad structure of the invention.

FIG. 6 is a sectional view taken along line 6—6 of FIG. 5.

FIG. 7 is a view in elevation of a different embodiment of the support pad structure of the invention.

FIG. 8 is a sectional view taken along line 8—8 of FIG. 7.

DETAILED DESCRIPTION OF PREFERRED EMBODIMENTS OF THE INVENTION

Referring initially to FIG. 1, shown therein is a schematic illustration of certain parts of a tracked vehicle which are utilized in conjunction with the equalizer bar support pad structure of the present invention. The illustrated structure includes a main frame 10 (as shown in transverse section), an engine 11, a main frame support saddle 12 which is secured to the lower side of the main frame, and an elongated equalizer bar 14 which extends transversely of the tracked vehicle, and has its opposed ends rested upon, and supported by, the trucks or track roller frames 16 and 18 of the vehicle. Portions of the continuous or endless tracks 20 are shown on the two track roller frames 16 and 18.

In referring to FIGS. 1 and 2, it will be noted that the main frame support saddle 12 is an arcuate or curved member and that the support saddle includes a top plate 22 and a pair of side plates 24 and 26. The top plate 22 is convex in its configuration relative to the equalizer bar 14 with the lowest portion of the top plate 22 bearing against a horizontally extending upper plate 28 forming a portion of the equalizer bar 14. The equalizer bar 14 further includes a pair of side plates 30 which have secured to the lower edge thereof a lower plate 32. At its center, the equalizer bar 14 has projecting from the side plates 30, a pair of tubular projections 34 and 36. Although solid cylindrical bar stock might be used in place of the tubular projections 34 and 36, the tubular projections are preferably employed in order to permit them to be internally welded (plug welded) to the side plates 30 of the equalizer bar as indicated by the reference numeral 40 in FIG. 3. This prevents the weldment from interfering with the movement of the tubular projections 34 and 36 within a receiving portion of the support pad structure as hereinafter described.

Positioned between the opposite sides of the equalizer bar 14 and the side plates 24 and 26 of the main frame supporting saddle 12 are a pair of support pad structures designated generally by reference numeral 42. Each of the support pad structures 42 includes a U-shaped heat treated spring metal member 44 centrally positioned in the support pad structure for receiving one of the tubular projections 40 between the legs thereof, and having the opposed legs thereof bonded to an elastomeric material 46, such as rubber. In the embodiment of the support pad structure 42 depicted in FIGS. 1-5, the body of elastomer 46 has embedded therein spring metal reinforcing elements, these being, in the illustrated embodiment, of an inverted U-shaped configuration, and being designated by reference numeral 48. The spring metal reinforcing elements 48 are bonded to the rubber and are positioned on opposite sides of the U-shaped member 44.

The support pad structure 42 further includes a pair of L-shaped retainer plates 50, which are also constructed of heat treated spring metal and which each have one leg 50a bonded to the elastomeric material 46, and a horizontally extending leg 50b which projects to one side of the support pad structure, and has an aperture 52 formed therein for receiving a retaining bolt for purposes hereinafter described. At the laterally outer extremities of the support pad structure 42, this structure includes a pair of vertically extending columns 54 of elastomeric material, such as rubber, and these columns have a taper or bevel along one edge thereof providing a vertically extending surface 56. It will be noted that the general shape, as viewed in elevation, of the support pad structure 42 is rectangular, and that the elastomeric material 46 has a monoplanar top surface or side 58 and a substantially monoplanar lower surface or side 60.

For the purpose of mounting the support pad structures to the side plates 24 and 26 of the main frame support saddle 12, a pair of laterally or horizontally spaced mounting brackets 62 and 64 are formed on the side plate 24 of the saddle, and a pair of horizontally spaced mounting brackets 66 and 68 are secured to the side plate 26 thereof. The mounting brackets 62–68 are secured to the respective side plates 24 and 26 of the saddle 12 by welding in the angle between the outer sides of these brackets and the respective side plates so that a weldment of generally triangular configuration is formed and is designated in the drawings by reference numeral 70. It will be noted further that each of the mounting brackets 62–68 is bored from the lower end thereof with a threaded bore in order to permit retaining bolts to be threaded into these blocks for a purpose hereinafter described.

Securing plates 72 are extended beneath the lower side of the support pad structures 42, and each of the securing plates has outer end portions which are apertured. The apertures in each securing plate register with the apertures formed through the horizontally extending legs 50b of the L-shaped angular retainer plates 50 of the respective support pad structure 42. For mounting the support pad structures 42 in their operative position, bolts 74 are then extended through the registering apertures in the securing plate and the horizontally extending legs 50b of the L-shaped retainer plates 50 and are threaded into the threaded bores in the lower ends of the respective mounting brackets 62–68. In this way, the support pad structures are secured to, and made movable with, the saddle 12 by reason of their engagement with the mounting brackets 62–68.

OPERATION

In the operation of the equalizer bar support pad structure of the invention, when the track roller frames 16 and 18 of the tracked vehicle are horizontally aligned, that is, when the vehicle is moving over relatively even ground, the equalizer bar 14 extends horizontally and is centered with respect to the saddle 12 so that the lowest portion of the top plate 22 of the saddle bears against the center of the top plate 28 of the equalizer bar. In this position, the equalizer bar receives and carries the weight of the main frame 10 and the engine 11. No loading of the support pad structures 42 occurs since the tubular projections 34 and 36 at this time do not touch the U-shaped spring metal member 44 and no load is transmitted to the support pad structures.

At such times as the trucks or tracked roller frames 16 and 18 undergo oscillation with respect to each other—that is, one of the track roller frames is elevated in respect to the other—the equalizer bar 14 is rocked to a position in which it is inclined with respect to the horizontal, similarly to the position illustrated in FIG. 2. When this occurs, the equalizer bar 14 pivots or rocks on the top plate 22 of the saddle 12, and the precise center of the equalizer bar is moved out of contact with the saddle. The result of this oscillating action of the track roller frames 16 and 18 is that upon canting or angling of the equalizer bar 14, the tubular projections 34 and 36 are caused to move downwardly in relation to the top plate 22 of the saddle 12. The support pad structures 42 are, however, retained in a stationary position by virtue of their bolted engagement with the mounting brackets 62–68 which are welded to the side plates 24 and 26 of the saddle 12. Therefore, the tubular projections 34 and 36 move down until they contact the one or the other of the legs of the U-shaped spring metal member 44 and, in the case of extreme oscillations, contact may be established with the bight portion of the spring metal member. This results in transfer of a portion of the load of the main frame 10 and engine 11 to each support pad structure 42.

The loading results in compression of the body 46 of elastomeric material in one direction and a placing in tension of this body at another point in the body. However, due to the particular construction of the body of elastomeric material in relation to the U-shaped spring metal member 44 and, as the body is reinforced by the reinforcing elements 48, such distortion as occurs does not result in permanent deformation of either the body of elastomeric material or, more importantly, of the U-shaped spring metal member 44. Thus, when the oscillation of the track roller frames 16 and 18 is terminated, and a level status of the equalizer bar 14 is restored, the loading of the support pad is relieved, and the resiliency and mechanical construction utilized in the case of the support pad restore the U-shaped spring metal member 44 and the body 46 of elastomeric material to the original load-free condition illustrated in FIG. 4.

The described support pad construction has been found to be characterized in having a long, defect-free service life in which the support pad structure stands up well to the stresses imparted thereto, and the several structural elements do not become fractured or in any other way defective during relatively extreme operating conditions of the vehicle.

A modified embodiment of the invention is depicted in FIGS. 7 and 8. Since some of the structural elements used in this embodiment of the invention are identical to those employed in the embodiment depicted in FIGS. 1–6, identical reference numerals have been utilized to identify these elements. Thus, there is included in the embodiment of the invention depicted in FIGS. 7 and 8, a U-shaped spring metal member 44 which is positioned in an accommodating U-shaped recess formed in a body 46 of elastomeric material, such as rubber or the like. The body of elastomeric material has a top edge or side 58 and a bottom edge or side 60. In the embodiment under discussion, the reinforcing elements employed are relatively straight elongated strips or bars 76 of heat treated spring metal material which, as shown in FIG. 8, have an arcuate or concave cross-sectional configuration. The reinforcing elements 76 extend from the top side 58 of the elastomeric body 46 to the lower side 60 thereof.

Extending transversely across the body 46 at the lower side 60 thereof, and bonded to the lower side of the elastomeric material, is an angular retainer plate 78. The end portions of the retainer plate 78 project beyond the body 46 and beyond a pair of vertically extending columns of elastomeric material 80 and 82, and have bolt receiving apertures 84 formed therein. The columns 80 and 82 of elastomeric material have beveled edges forming surfaces 86 in the manner hereinbefore described. The support pad structure constructed as depicted in FIGS. 7 and 8 is utilized in substantially the same way as the support pad structure shown in FIGS. 5 and 6.

Although preferred embodiments of the invention have been herein described to provide an example of the construction of the invention suitable for use by one skilled in the art, it is to be understood that various changes and innovations can be made in the depicted and described structures without departure from the basic principles of the invention. For example, though preferred constructions include the spring metal reinforcement elements embedded in the body of elastomeric material as hereinbefore described, working support pad structures have been made and used which do not include such spring metal reinforcing elements, and they are therefore not essential to the attainment of the fundamental objects of the invention. All changes and innovations of the type described which do not depart from the basic principles of the invention are deemed to be circumscribed by the spirit and scope of the invention except as the same may be necessarily limited by the appended claims or reasonable equivalents thereof.

What is claimed is:

1. An equalizer bar support pad structure for supporting an equalizer bar on a support saddle comprising:

a U-shaped spring metal member for receiving between the legs thereof, a pin carried by said equalizer bar;

a body of elastomeric material having a U-shaped recess therein complementary in configuration to said U-shaped spring metal member and receiving said U-shaped spring metal member, said body of elastomeric material being bonded to said U-shaped member on one side thereof, and having a first side in which said U-shaped recess is formed, and a second side on the opposite side of said body from said first side; and angular retainer plate means secured to said body of elastomeric material and having apertured portions extending from said body in substantial alignment with the plane of said second side of said body, and in a plane extending substantially normal to the planes of the legs of said U-shaped member.

2. An equalizer bar support pad structure as defined in claim 1 wherein said retainer plate means comprises a pair of horizontally spaced, L- shaped plates disposed on opposite sides of said U-shaped member and each including one of said apertured portions, and further including a second portion secured to, and extending normal to, said apertured portion and parallel to the legs of said U-shaped member, said second portion being bonded to said body of elastomeric material.

3. An equalizer bar support pad structure as defined in claim 1 wherein said retainer plate means comprises a plate extending along the lower side of said body of elastomeric material and having a portion thereof between said apertured portions bonded to the lower side of said body of elastomeric material.

4. An equalizer bar support pad structure as defined in claim 1 and further characterized to include spring metal reinforcing elements embedded in said body of elastomeric material and extending substantially parallel to the legs of said U-shaped member.

5. An equalizer bar as defined in claim 4 wherein each of said spring metal reinforcing elements comprises a U-shaped spring metal element having a bight portion facing said upper side of said body of elastomeric material and the legs thereof extending downwardly toward the lower side of said body.

6. An equalizer bar support pad structure as defined in claim 5 wherein said retainer plate means comprises a pair of horizontally spaced L-shaped plates disposed on opposite sides of said U-shaped member and each including one of said apertured portions, and each further having a second portion secured to, and extending normal to, said apertured portion and parallel to the legs of said U-shaped member, said second portion being bonded to said body of elastomeric material.

7. An equalizer bar support pad structure as defined in claim 4 wherein said spring metal reinforcing elements each comprises a spring metal bar of arcuate cross-sectional configuration extending from the upper side of said body to the lower side thereof.

8. An equalizer bar support pad structure as defined in claim 7 wherein said retainer plate means comprises a plate extending along the lower side of said body of elastomeric material and having a portion thereof between the apertured portions bonded to the lower edge of said body of elastomeric material.

* * * * *